June 2, 1936.  H. HEINIS  2,042,599
ENDLESS FILM REEL
Filed Aug. 14, 1933  4 Sheets-Sheet 1
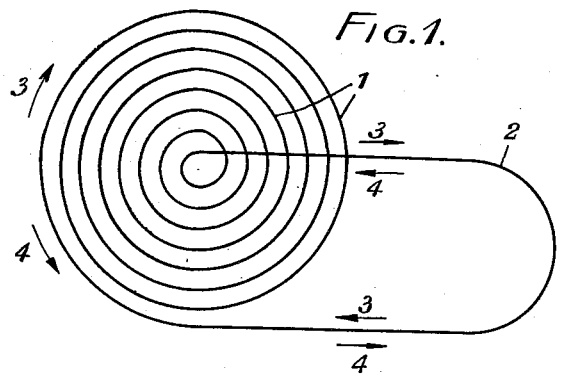
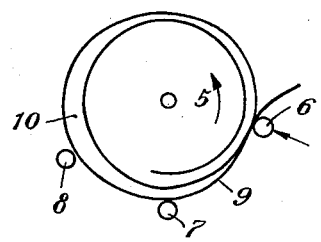
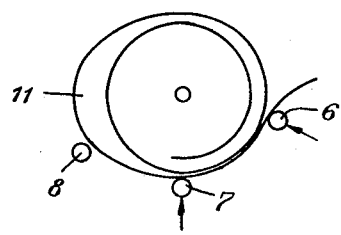
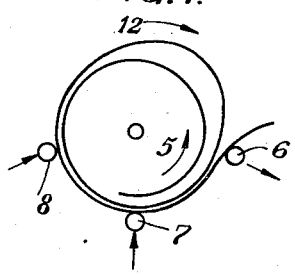
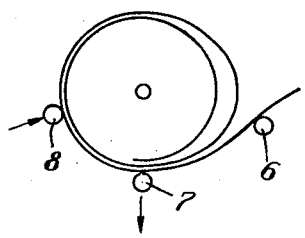
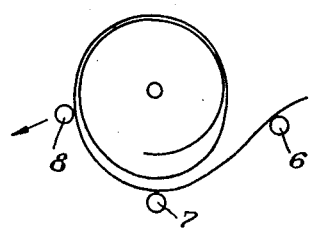
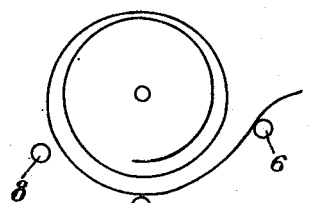
Inventor:
H. Heinis
By E. F. Wenderoth
atty June 2, 1936.  H. HEINIS  2,042,599
ENDLESS FILM REEL
Filed Aug. 14, 1933  4 Sheets-Sheet 3

Inventor:
H. Heinis
By C. F. Hendiroth
atty

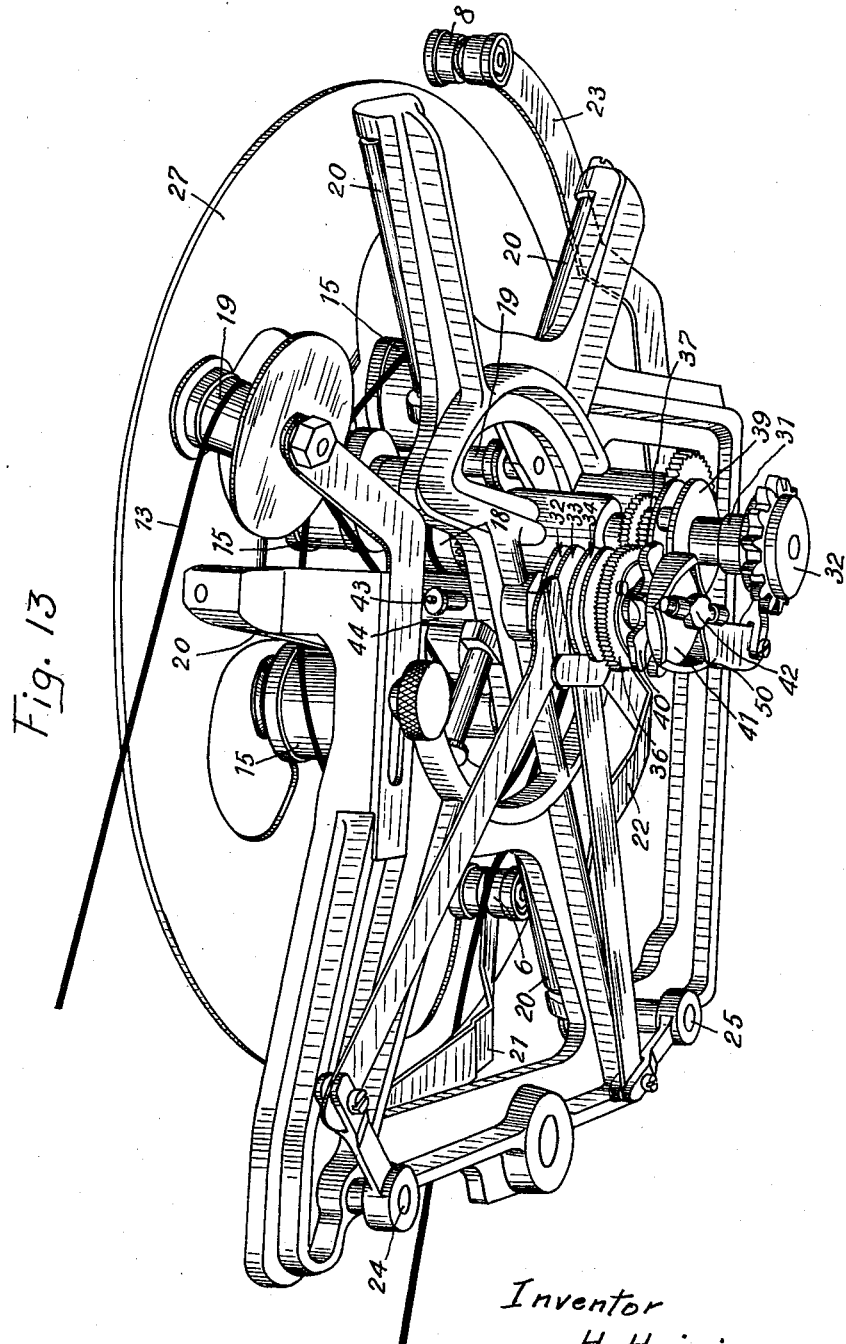

Patented June 2, 1936

2,042,599

UNITED STATES PATENT OFFICE 2,042,599

ENDLESS FILM REEL

Hugo Heinis, Geneva, Switzerland

Application August 14, 1933, Serial No. 685,108
In Switzerland August 18, 1932

18 Claims. (Cl. 88—18.7)

The invention relates to a winding-up and unwinding device of an endless band wound up, except for a loop, in superposed layers forming a spiral.

Such a device is most applicable particularly to a cinematographic apparatus projecting a film recorded on an endless band which is wound up and unwound according to the manner indicated and which manner is represented diagrammatically in Fig. 1 of the annexed drawings.

In this figure the superposed layers, forming a spiral, are situated in 1, whilst the loop, not belonging to the spiral, is situated in 2, the loop passing for example through the projecting devices in the case of the example cited above.

The device according to the invention is characterized by the fact that it allows the winding-up and unwinding of the band to take place both in the direction where the different parts of the latter pass from the periphery to the centre of the spiral and in the direction where they pass from the centre to the periphery, that is to say, if Fig. 1 is consulted, the movement of the band can as well be effected in the direction of the arrows 3 as in the direction of the arrows 4.

This device can for example comprise means which, when the direction of the winding-up and unwinding is such that the different parts of the band pass successively from the centre of the spiral to the periphery of the latter, cause at certain moments a sliding of the exterior spires one upon the other and upon the spires situated nearer the centre, the direction of rotation of the sliding the centre, the direction of rotation of rotation movement being contrary to the direction of rotation given to the spiral in consequence of the winding-up and unwinding movement of the latter.

The annexed drawings represent a form of execution of the object of the invention, given by way of example:

Fig. 1, as above stated, is a diagrammatic representation of the manner of winding the endless film band.

Figs. 2 to 7 show diagrammatically the principle of the device.

Figure 13 is a perspective view of the device.

Figure 8:
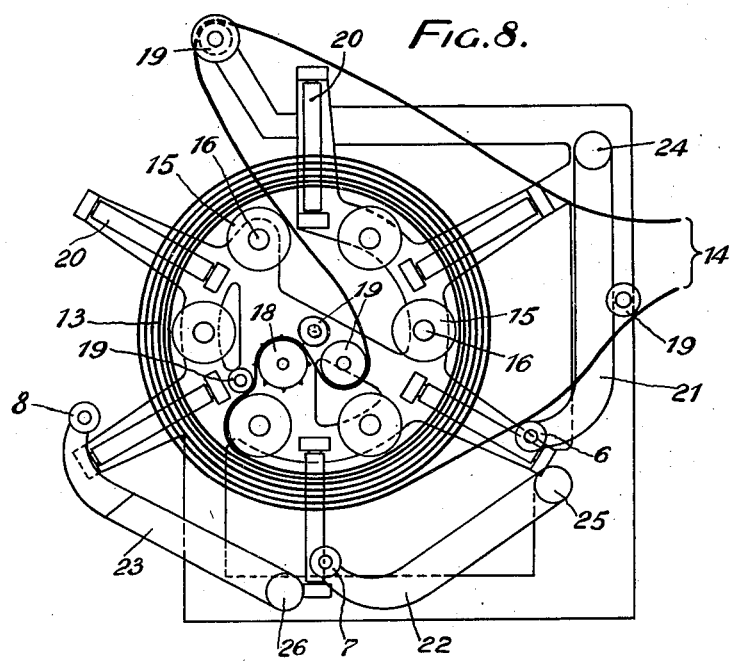
Fig. 8 is a front view, with one of the cheeks of the bobbin taken away.

In a winding-up and unwinding device of the kind considered, it is usual for the winding-up and unwinding operation to be effected in the direction of the arrows 3 in Fig. 1, this operation not offering any difficulty. Owing to the fact that some of the band is constantly taken away from the centre and that some of it is constantly added to the periphery, the spiral has a tendency to augment in diameter, but by a sliding of the spires one upon the other, it in reality automatically keeps its original dimensions.

Such is not the case when the reverse operation is executed, in the direction of the arrows 4 in Fig. 1. In this case, spires are constantly added to the centre, and some are taken away from the periphery; and the diameter of the spiral has owing to this fact a tendency to diminish. As this diminution involves a pressing of the spires one against the other and on the core bearing them, a sliding movement is no longer possible and after functioning a short time, the band is blocked.

The device to be described does away with this impossibility according to the manner represented in principle in Figs. 2 to 7 of the drawings, in which only a few spires have been represented.

The direction of rotation of these spires being that of the arrow 5, the compression of the spiral is prevented in the following way.

Three drivers 6, 7, 8 are distributed in as many points on the periphery of the spiral, for example approximately on the lower semi-circumference of the periphery, supposing the spiral to be upright, in a vertical plane.

Although these members, constituted for example with rollers, are indicated here as three in number, they could also number two only or more than three and be disposed in a different manner to that which will be described. But practically, the disposition drawn has turned out to be one of the best when the members 6, 7, 8 are placed in such a way that one of them, member 6, is situated at the place when the last exterior spire 9 leaves the spiral, the other two members 7 and 8 being situated opposite this spire.

Then while the spiral, mounted on a core not here shown, is turning in the direction of the arrow 5, the first member 6 is applied against the latter (see Fig. 2). The member 6 being a roller, compresses the spires without preventing rotation, but it prevents, on the other hand a relative sliding of the spires one upon another. Compressed thus in one point, they will get loose elsewhere, for example in 10.

At this moment and without relaxing the pressure on the member 6, the member 7 is pressed likewise against the spires (see Fig. 3); that is to say the member immediately preceding member 6 with regard to the direction of rotation. The effect produced is the same as that produced just now, but the free part of the spires, principally the exterior spires is still further separated from the centre and forms a loop which becomes larger and the spires become more and more spaced in 11.

The member 6 can then be withdrawn without any risk of the loops being distributed again on the circumference of the spiral, the member 7 preventing by its compression any relative sliding of the spires.

But while the member 6 is withdrawn and while the member 7 remains applied, the application of the member 8 ends the operation by raising the loops which have just been formed and which will pass thus over the spiral in the direction of arrow 12 (see Fig. 4).

The withdrawal of the member 6 continuing and the withdrawal of the member 7 being then effected, these loops urged by their own weight will fall as shown in Figs. 5 and 6, the exterior spires effecting thus a sliding movement one upon another and on the interior spires in the reverse direction to the direction of rotation of the spiral.

After the withdrawal of member 8, the whole occupies the position indicated in Fig. 7.

The sliding movement caused by the operations described being nothing else but a turning backwards of certain spires contrary to the direction of rotation of the spiral, a loosening of the latter takes place, preventing its blockage owing to an excessive compression on the core.

By repeating the operation described according to a certain rhythm, the frequency of which being made dependent upon the speed of rotation of the spiral, that is to say greater in proportion as the winding-up and unwinding is more rapid, this operation may be effected in the direction from the centre to the periphery with as much facility as it was executed in the reverse direction.

A disposition of the spiral in a vertical plane was alluded to above, for the spiral can indeed be situated flatwise, in a horizontal plane. The law of gravity not then helping to bring the spires backwards, its effect can be replaced by a greater number of members such as 6, 7, 8.

The rest of this description has been supposed to relate to an endless cinematographic film wound up according to a spiral placed in a vertical plane, as shown in Fig. 8.

The spiral is to be found in 13 and the loop exterior to the spiral is to be found in 14.

The spiral is wound on a core formed with a certain number of rollers 15 turning loosely on axes 16 parallel to axis 17 of the bobbin thus formed and disposed on a concentric circumference to the axis of the bobbin. In 18 there is a driving member of the film and in 19 rollers situated in different places intended to guide it.

One of the cheeks of the bobbin is formed by rollers 20 disposed radially and turning loosely round fixed axes, so as not to oppose any friction resistance laterally to the spires.

The other cheek has been taken away in order to facilitate the reading of the drawings; it will be referred to later on.

Three members or rollers 6, 7, 8 are disposed here, as has just been described with reference to Figs. 2 to 7.

Their axes, on which they can turn loosely are fixed on three oscillating levers 21, 22 and 23, the pivoting points of which are the points 24, 25, respectively 26.

The manner of acting of rollers 6, 7, 8 having been explained, the manner in which they are controlled is all that now remains to be described. This control, intended to cause the oscillation of levers 21, 22, 23, according to a given law, can be effected in very different ways, a simple solution consisting in making the levers act by means of cams. But whatever may be the kind of control considered, it is evident that there should be a mechanical connection between the control and the driving members of the film, for example member 18, so that the rythm of working of the levers may accelerate its frequency when the winding-up and unwinding of the film is more rapid. Moreover, this connection should be preferably such that when the winding-up and unwinding is effected from the periphery to the centre, the levers 21, 22 and 23 remain inactive, so as only to be set into motion at the moment of the winding-up and unwinding from the centre to the periphery of the spiral.

Figures 9, 10:
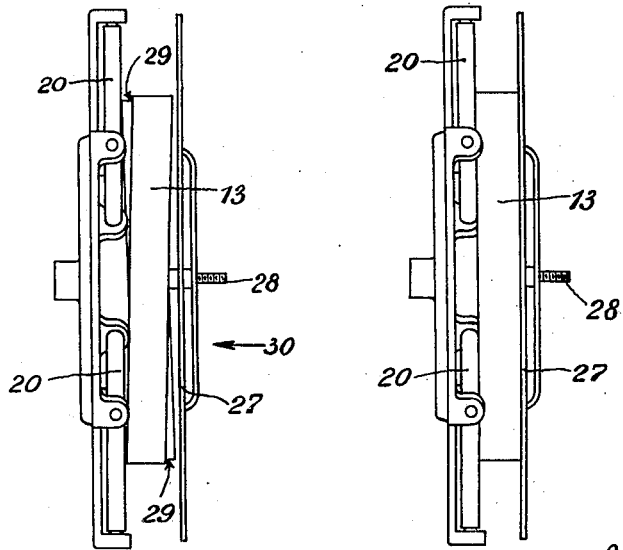
Figs. 9 and 10 are side views of the bobbin shown in Fig. 8.

For the good working of the above operations, it is preferable that the cheek of the bobbin not shown in Fig. 8 should be axially movable as shown in Figs. 9 and 10.

In these figures, the fixed cheek is again shown with its rollers 20 and the spiral 13 of the wound-up film. The movable cheek is represented in 27 and is formed with a metallic disk screwed on to the central rod or axis 28 of the bobbin.

Fig. 9 represents the normal position of this movable cheek and Fig. 10 its working position.

In its normal position according to Fig. 9, this cheek is situated farther from the fixed cheek than is necessitated by the width of the film, so that the spires of the latter have plenty of room to overlap a little, as indicated in 29. This freedom of movement of the film greatly facilitates the sliding movement of the spires caused by the rollers 6, 7, 8, it would be bad however in the long run for a good winding-up and unwinding of the film, so that the latter has from time to time to be brought back into a correct winding-up position, the spires no longer overlapping.

By displacing the movable cheek in the direction of the arrow 30, i. e. parallelly to itself in the axial direction, so as to apply it against the spires, as shown in Fig. 10, this putting into order of the spires is thus effected. This displacement should be effected preferably every time a cycle of operations of levers 21, 22, 23 has been completed, and it should be done abruptly and for a short time, so as to not to cause a too long slowing-down of the spiral rotation-movement.

The mechanical means causing this movement of the cheek and which parts should be connected to the mechanical parts controlling the movements of the levers, may be of any kind, for example a cam; the frequency of the applications of the cheek onto the spiral being therefore also a function of the speed of rotation of the spiral.

Figure 11:
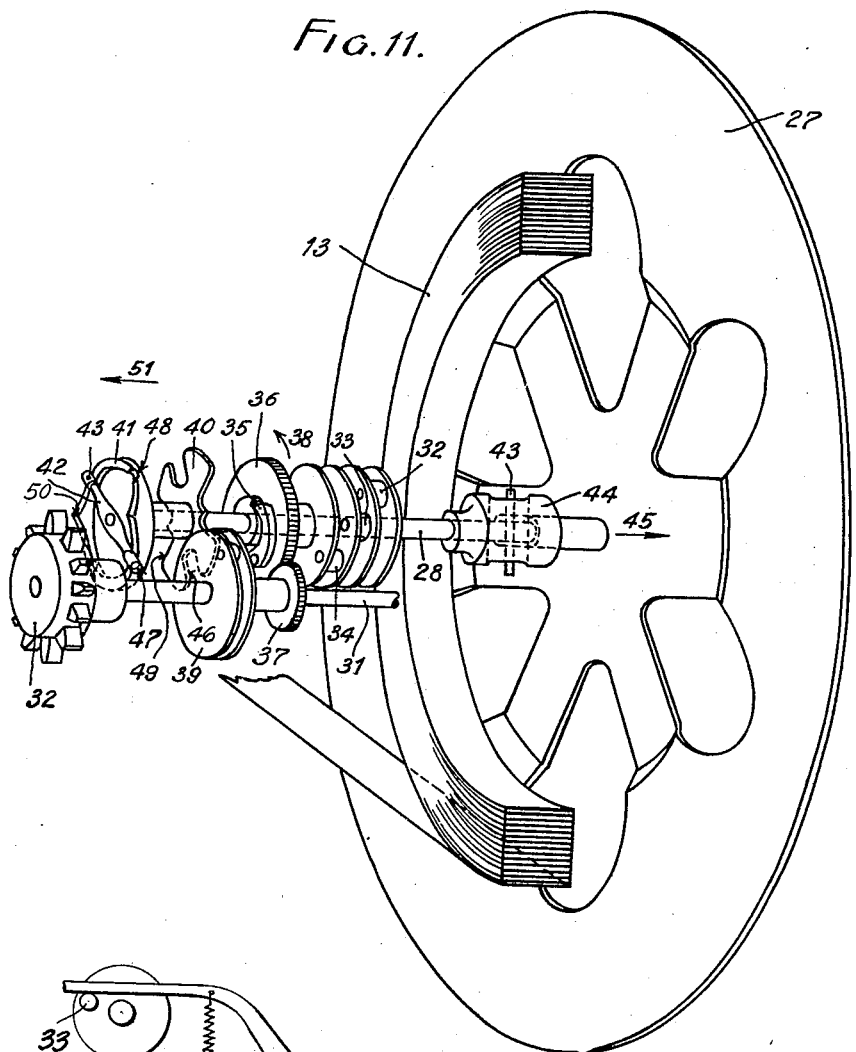
Fig. 11 is a perspective view of one part of the control members of the device.
Figure 12:
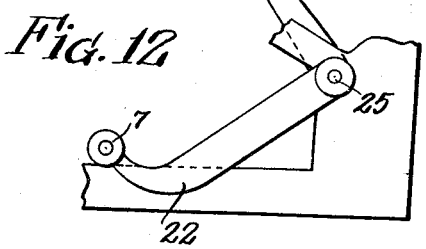
Figure 12 is a view of a detail.

Fig. 11 is a perspective view showing a manner of arranging the mechanical control of the device described with reference to Figs. 8 to 10.

In Fig. 11 the spiral of the film 13, the movable cheek 27 and the axis 28 on which it is screwed are again shown. The axis 31 is the axis driving the driving member 18 of the Fig. 8, this axis being itself driven by a chain not here shown of the cinematographic apparatus and acting on the toothed-wheel 32 either in the one or in the other direction.

The member 18, the fixed cheek, the rollers forming the core, etc. have not been represented with a view to simplifying the drawings.

The control of the three levers 21, 22, 23 is effected by the three cams 32, 33, 34; by means of the pawl 35, the cams making a whole with the toothed-wheel 36 driven by the toothed-wheel 37. The relation between these two wheels determines the frequency of the movements of the levers with respect to the speed of the winding-up and unwinding of the film. The pawl borne by the wheel 36, only drives the cams in the direction of the arrow 38, corresponding well, if Figs. 8 to 11 are compared to the direction of rotation of the spiral when it is wound up from the centre and unwound from the periphery. The cam 32, the first one which acts in the direction of rotation indicated, will control the lever 6, whilst the cams 33 and 34 will act respectively on the levers 7 and 8. So as not to overcharge the drawing, the intermediary organs between the cams and the levers have not been represented.

Due to the pawl 35, the levers will not be controlled, when the direction of rotation of the spindle corresponds to a winding-up at the periphery and an unwinding at the centre, reverse direction to that of the arrow 38.

On the shaft 31 is also mounted a cam formed with a gearing 39 with a pin-wheel the other cams being moreover formed in the same way. This tooth engages a star wheel 40 mounted loosely on the axis 28 but integral with a cam 41. A double lever 42 terminated at its ends by rollers 43 propped by the curve of the cam is integral with the axis 28 of the cheek 27, this axis not being able to turn, being guided by a pin 43 maintained in a vertical plane by a fixed muff 44.

In the interior of the muff 44, a spring not here shown pushes the pin 43, that is the axis 28 in the direction of the arrow 45, that is to say into a position remote from the cheek 27, with the result that the ends of the double lever 42 are applied against the cam 41.

Starting from the position represented and in the direction of rotation corresponding to the arrow 38, it will be seen that the pin wheel 39 after having effected nearly one forward turn on the drawing, will penetrate into the space of tooth 46 and will make both the star wheel 40 and the cam 41 turn a certain angle, bringing the cam into a position where the double lever 42 will no longer rest in the dimples 47, but in the dimples 48. At the next turn of the pin wheel, the latter will drive once again the star wheel 40 by acting upon the face 49 of one of its points, bringing the nobs 50 of the cam under the ends of the double lever which will thus be displaced in the direction of the arrow 51, causing the application of the cheek 27, which is integral with it, against the spiral of the film.

But, as soon as the ends of the double lever reach and exceed a little the nobs 50, the pressure of the double lever on the inclined faces then presented by the cam causes a rotation of the latter, a rotation rendered possible by the greater space of tooth of the star wheel 40 in which the pin wheel is engaged at that moment. Owing to this, the application of the cheek 27 against the spiral occurs only for a short while, rather abruptly.

At the following turn of the cam 39, the operations described recommence, by the introduction of the pin wheel into the space of tooth of the star wheel 40 opposite to the space of tooth 46.

If the working of the device is reversed, in spite of the levers 6, 7, 8 becoming inactive, the movable cheek will effect its movements which can but facilitate the winding-up and unwinding of the film, whatever may be the direction of this movement.

It is evident that the regulating of the movements of the cheek, so that they should occur in one direction immediately after the action of the levers 6, 7, 8 is only a matter of regulation to be provided at the fitting up.

It is also evident that the example which has just been described is only one possibility among many of controlling the levers and the cheek, mechanics offering many and diverse means of effectuating this control.

Finally, it is to be remarked that, both as regards the control of the levers and that of the cheek, it is suitable to provide an elastic transmission of the movements.

For the levers, this is suitable if bands of different lengths are to be used and the spiral of which will therefore be more or less thick. Elastic members inserted in the control device will allow, whilst keeping a real constant amplitude of the control, for the band not to be crushed if the thickness of the spiral should not allow the levers a displacement corresponding to this full amplitude.

For the cheek, an elastic application of the latter against the lateral face of the spiral would, from every point of view, be preferable, to a non-elastic application.

What I claim as my invention and desire to secure by Letters Patent of the United States of America is:—

1. A device for winding endless bands such as cinematograph films and the like in which a loop is disposed outside of the device comprising means for supporting a coiled band with the layers thereof in superposed spiral relation, means for winding said bands at the center thereof and unwinding the same from the periphery thereof and means for compressing the outermost spirals at spaced points alternately in a direction tending approximately towards the center of the band so that a sliding of the exterior spirals upon one another and upon the spirals situated nearer the center may occur contrary to the direction of rotation of said band in unwinding the same.

2. A device for winding endless bands such as cinematograph films and the like in which a loop is disposed outside of the device comprising means for supporting a coiled band with the layers thereof in superposed spiral relation, means for winding said bands at the center thereof and unwinding the same from the periphery thereof, a plurality of pivoted rotary compressing elements located so as to act against the exterior spirals of said band and means for operating said rotary elements alternatively.

3. A device for winding endless bands such as cinematograph films and the like in which a loop is disposed outside of the device comprising means for supporting a coiled band with the layers thereof in superposed spiral relation, means for winding said bands at the center thereof and unwinding the same from the periphery thereof, means for compressing intermittently the exterior spirals of said band towards approximately the center of said band and means for operating said compressing means in synchronism with the unwinding of said band.

4. A device for winding endless bands such as cinematograph films and the like in which a loop is disposed outside of the device comprising means for supporting a coiled band with the layers thereof in superposed spiral relation, means for winding said bands at the center thereof and unwinding the same from the periphery thereof, a plurality of compressing elements spaced around the periphery of said band so as to intermittently compress the exterior spirals towards the center of said band, means for operating said compressing elements alternatively and means for operating said compressing elements with a frequency proportional to the speed of rotation of the band in unwinding the same.

5. A device for winding endless bands such as cinematograph films and the like in which a loop is disposed outside of the device comprising a holder for the band, a plurality of pivoted levers mounted upon said holder, rollers carried by said levers and means for oscillating said levers so as to bring said rollers into contact with the external spirals of said band to compress the same approximately towards the center of the spiral.

6. A device for winding endless bands such as cinematograph films and the like in which a loop is disposed outside of the device comprising a holder for the band, a plurality of pivoted levers mounted upon said holder, rollers carried by said levers, means for oscillating said levers so as to bring said rollers into contact with the external spirals of said band to compress the same approximately towards the center of the spiral and means for oscillating said levers alternately so that as one roller has completed its compression movement against the external spirals of said band a succeeding roller will begin its compression movement.

7. A device for winding endless bands such as cinematograph films and the like in which a loop is disposed outside of the device comprising a holder for said band, a plurality of oscillating levers mounted upon said holder, rollers carried by said levers, means for feeding said band from the exterior thereof and winding the band at the center and means for oscillating said levers controlled by said feeding means for said band.

8. A device for winding endless bands such as cinematograph films and the like in which a loop is disposed outside of the device comprising a holder for said band, means for feeding said band and at the same time winding said band, means for urging the exterior spirals of said band towards aproximately the center thereof at spaced points around the periphery of said band, said last named means being under the control of said feeding and winding means for said band.

9. A device for winding endless bands such as cinematograph films and the like in which a loop is disposed outside of the device comprising a holder for said band, means for unwinding and winding said band, said last named means being operative to wind said band at the center of said spiral and unwind the band from the periphery of said spiral and also to wind said band at the periphery of said spiral and unwind the band at the center of said spiral, means for compressing said exterior spirals of said band towards approximately the center of said spiral and means for rendering said last named means inoperative when said feeding means are operating to unwind said band from the center of said spiral and wind the same at the periphery thereof.

10. A device for winding endless bands such as cinematograph films and the like in which a loop is disposed outside of the device comprising a holder for said band, means for unwinding said band from either the periphery or the center of said spiral, a plurality of oscillating levers mounted upon said holder, means carried by said levers for alternately compressing the external layers of said spiral toward approximately the center of said spiral, means for rendering said last means operative only when said band is being unwound from the periphery thereof and being wound at the center thereof and means for elastically controlling said levers so as to permit the device to be applicable to bands of varying diameters.

11. A device for winding endless bands such as cinematograph films and the like in which a loop is disposed outside of the device comprising a holder for said band, a series of rollers mounted upon said holder constituting the core for said band, said rollers being mounted on fixed axes located parallel to the axis of said holder and being arranged concentric to said axis, said holder having a fixed cheek, a movable cheek also mounted upon said holder, means for unwinding said band from said holder and means for moving said movable cheek in synchronism with said unwinding means.

12. A device for winding endless bands such as cinematograph films and the like in which a loop is disposed outside of the device comprising a fixed cheek, a plurality of rollers mounted upon said cheek constituting a core for said band, means for unwinding and winding said band, a movable cheek contacting one edge of said band while disposed on said core and means for reciprocating said movable cheek into contact with said edge and out of contact with the same so as to intermittently adjust the spirals of said band into superposed relation.

13. A device for winding endless bands such as cinematograph films and the like in which a loop is disposed outside of the device comprising a fixed cheek, a plurality of rollers mounted upon said cheek constituting a core for said band, means for unwinding and winding said band, a movable cheek contacting one edge of said band while disposed on said core and means for reciprocating said movable cheek into contact with said edge and out of contact with the same so as to intermittently adjust the spirals of said band into superposed relation, said last named means being controlled by said unwinding means.

14. A device for winding endless bands such as cinematograph films and the like in which a loop is disposed outside of the device comprising a fixed cheek, a plurality of rollers constituting a core for said band mounted upon said fixed cheek, a movable cheek reciprocating towards and away from one edge of said band when mounted upon said core, a plurality of oscillating levers disposed about the external spirals of said band, compressing means mounted upon said levers, means for alternately urging said compressing means against the external layers of said spiral to urge the same in a direction approximately towards the center of said spiral, means for unwinding said band and said last named means controlling the oscillations of said levers and the reciprocation of said movable cheek.

15. A device for winding endless bands such as cinematograph films and the like in which a loop is disposed outside of the device comprising a fixed cheek, a plurality of rollers constituting a core for said band mounted upon said fixed cheek, a movable cheek reciprocating towards and away from one edge of said band when mounted upon said core, a plurality of oscillating levers disposed about the external spirals of said band, compressing means mounted upon said levers, means for alternately urging said compressing means against the external layers of said spiral to urge the same in a direction approximately towards the center of said spiral, means for unwinding said band, said last named means controlling the oscillations of said levers and the reciprocation of said movable cheek and elastic means interposed in said control by said unwinding means in order to permit the movements of said cheek and said compressing means to accommodate themselves to bands of varying width and diameter.

16. A device for winding endless bands such as cinematograph films and the like in which a loop is disposed outside of the device comprising a holder for said band, means for unwinding said band from said holder either from the center of said spiral or from the periphery of said spiral, means for preventing locking of said band when said band is unwound from the periphery thereof, means for intermittently aligning the spirals of said band in superposed relation and means controlled by said unwinding means controlling the operation of said last named means and said means for preventing blocking.

17. A device for winding endless bands such as cinematograph films and the like in which a loop is disposed outside of the device comprising a holder for said band having a fixed cheek and a reciprocating cheek, means for unwinding said band from either the periphery thereof or the center thereof, means for preventing blocking of said band at the center thereof when the band is unwound from the periphery thereof and means controlled by said unwinding means for intermittently reciprocating said movable cheek and intermittently operating said means for preventing blocking.

18. A device for winding endless bands such as cinematograph films and the like in which a loop is disposed outside of the device comprising a fixed cheek, a series of rollers mounted upon said cheek constituting a core for said band, means for unwinding said band from either the periphery or the center of said spiral, a plurality of pivoted levers disposed around the periphery of said band, compression means carried by said levers for compressing the external spirals of said band towards approximately the center of said spiral, means for alternately operating said compressing means in a certain predetermined sequence, a movable cheek reciprocating towards and away from said fixed cheek so as to align the spirals of said band in superposed relation and means controlled by said unwinding means for controlling the reciprocations of said movable cheek and rythm of said compressing means.

HUGO HEINIS.